United States Patent [19]

Kress et al.

[11] Patent Number: 4,751,260

[45] Date of Patent: Jun. 14, 1988

[54] FLAME-RETARDING, POLYCARBONATE MOULDING MATERIALS OF HIGH IMPACT STRENGTH

[75] Inventors: Hans-Jürgen Kress, Krefeld; Friedemann Müller, Neuss; Christian Lindner, Cologne; Horst Peters, Leverkusen; Josef Buekers, Krefeld, all of Fed. Rep. of Germany

[73] Assignee: Bayer Aktiengesellschaft, Leverkusen-Bayerwerk, Fed. Rep. of Germany

[21] Appl. No.: 857,491

[22] Filed: Apr. 30, 1986

[30] Foreign Application Priority Data

May 10, 1985 [DE] Fed. Rep. of Germany ....... 3516807

[51] Int. Cl.⁴ .............................................. C08K 5/52
[52] U.S. Cl. .................................... 524/130; 524/132; 524/140; 524/141; 524/142; 524/144; 524/504; 524/520; 525/67; 525/68; 525/69; 525/146; 525/148
[58] Field of Search ............... 524/140, 141, 504, 520, 524/130, 132, 142, 144; 525/67, 68, 69, 146, 148

[56] References Cited

U.S. PATENT DOCUMENTS

| | | |
|---|---|---|
| Re. 31,165 | 3/1983 | Serini et al. ............ 525/147 |
| 3,005,795 | 10/1961 | Busse et al. ............ 525/146 |
| 3,294,871 | 12/1966 | Schmitt et al. ......... 525/146 |
| 3,404,122 | 10/1968 | Fritz et al. ............. 524/141 |
| 3,787,528 | 1/1974 | Benghiat ............... 524/130 |
| 3,809,676 | 5/1974 | Liberti ................. 524/135 |
| 3,954,905 | 5/1986 | Margotte et al. ......... 525/67 |
| 4,251,425 | 2/1981 | Ohara et al. ........... 524/132 |
| 4,463,130 | 7/1984 | Serini et al. ............ 525/147 |
| 4,474,914 | 10/1984 | Spivack ................ 524/135 |
| 4,560,725 | 12/1985 | Van Bokhoven et al. ..... 525/67 |
| 4,564,654 | 1/1986 | Serini et al. ............ 525/147 |
| 4,649,168 | 3/1987 | Kress et al. ............ 524/132 |
| 4,657,955 | 4/1987 | Kress et al. ............ 524/130 |
| 4,692,488 | 9/1987 | Kress et al. ............ 524/139 |

FOREIGN PATENT DOCUMENTS

| | | |
|---|---|---|
| 80767 | 6/1983 | European Pat. Off. . |
| 103230 | 3/1984 | European Pat. Off. . |
| 174493 | 3/1986 | European Pat. Off. . |
| 3516807 | 11/1986 | Fed. Rep. of Germany ...... 524/130 |
| 3523314 | 1/1987 | Fed. Rep. of Germany ...... 524/132 |
| 2234348 | 1/1975 | France . |
| 2239512 | 2/1975 | France . |

OTHER PUBLICATIONS

Chemical Abstracts, vol. 90, Nr 18, Apr. 1979, p. 36, Nr. 138688v, Columbus, Ohio "Heat Stabilizers for Polycarbonate", Author: Ohara, Osamu.

Primary Examiner—John Kight
Assistant Examiner—Kriellion Morgan
Attorney, Agent, or Firm—Connolly & Hutz

[57] ABSTRACT

The present invention relates to flame-retarding, thermoplastic polycarbonate moulding materials of high impact strength consisting of halogen-containing polycarbonates, copolymers formed from styrenes and (meth)acrylonitrile, phosphorus compounds of the formula (I)

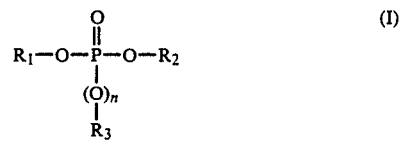

tetrafluoroethylene polymers and small amounts of graft polymers and, if appropriate, effective amounts of stabilizers, pigments, lubricants, mould release agents and/or antistatic agents, and to a process for the preparation thereof.

15 Claims, No Drawings

FLAME-RETARDING, POLYCARBONATE MOULDING MATERIALS OF HIGH IMPACT STRENGTH

The present invention relates to flame-retarding, thermoplastic polycarbonate moulding materials of high impact strength consisting of:

A. 50 to 90% by weight of a halogen-containing copolycarbonate formed from a dihydric phenol and a dihydric, halogenated, preferably brominated, phenol, the copolycarbonate containing 3 to 20% by weight of halogen, in particular bromine, in the form of co-condensed, halogenated, dihydric phenols, B. 10 to 50% by weight of a thermoplastic polymer formed from 50 to 95 parts by weight of styrene, α-methylstyrene, nuclear-substituted styrene or mixtures thereof and 5 to 50% by weight of (meth)acrylonitrile, C. 1 to 20 parts by weight, preferably 5 to 15 parts by weight, relative to 100 parts by weight of total weight of A. and B., of a phosphorus compound of the formula (I)

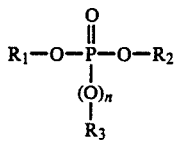

wherein
$R_1$, $R_2$ and $R_3$ independently of one another are optionally halogen-substituted $C_1$–$C_8$-alkyl or $C_6$–$C_{20}$-aryl which is optionally substituted by alkyl or halogen and
"n" represents 0 or 1, and D. 0.05 to 2.0 parts by weight, in particular 0.1 to 1.0 parts by weight, relative to 100 parts by weight of total weight of A. and B., of a tetrafluoroethylene polymer having average particle sizes of 0.05 to 20 μm and a density of 1.2 to 1.9 g/cm$^3$, the component D. being employed in the form of a coagulated mixture of emulsions of the tetrafluoroethylene polymers D. and emulsions consisting of not more than 3 parts by weight, but at least 0.1 part by weight, relative to 100 parts by weight of the sum of the components A+B, of E. graft polymers formed from 5 to 90 parts by weight, preferably 30 to 80 parts by weight, of a mixture of E.1.1 50 to 95% by weight of styrene, α-methylstyrene, nuclear-substituted styrene, methyl methacrylate or mixtures thereof E.1.2 50 to 5% by weight of (meth)acrylonitrile, methyl methacrylate, maleic anhydride, N-substituted maleimide or mixtures thereof, grafted onto E.2 95 to 10 parts by weight, preferably 70 to 20 parts by weight, of a rubber having a glass transition temperature $T_G \leq 10°$ C.

and the ratio by weight of the graft polymer E. to the tetrafluoroethylene polymer D. being between 95:5 and 60:40, and, if appropriate, effective amounts of stabilizers, pigments, lubricants, mould release agents and/or antistatic agents.

According to DE-OS (German Published Specification) No. 2,228,072, thermoplastic polycarbonates are rendered flame-retarding by means of a mixture of hexabromobenzene and an antimony compound, and can, additionally, contain a phosphate ester as a synergist. However, the sole addition of 10 parts by weight of triphenyl phosphate to bisphenol A-polycarbonate does not have an anti-drip action as specified in the flammability test U.L. Subj. 94 (see page 20 of DE-OS (German Published Specification) No. 2,228,072).

British patent specification No. 1,459,648 describes flame-retarding, non-dripping polymers composed, for example, of ABS polymers or polycarbonates, to which a fire-retarding additive, such as, for example, triphenyl phosphate or a halogen compound or a mixture of additives of this type, an incombustible fibre material and a polytetrafluoroethylene resin have been admixed. Example 2 of British patent specification No. 1,459,648 shows that the polytetrafluoroethylene resin without the fibre additive does not prevent dripping.

Thermoplastics capable of foaming are disclosed in DE-OS (German published specification) No. 2,434,085, the thermoplastics mentioned being, inter alia, polycarbonates, polymers or mixtures thereof. The polymers mentioned are also polymers formed from butadiene, styrene and acrylonitrile or from styrene alone. The foamable plastics can contain, as fire-retarding agents, phosphate esters, if appropriate in combination with halogen compounds. No polytetrafluoroethylene polymers are recommended as halogen compounds.

The addition of pentaerythritol diphosphates and diphosphonates as fire-retarding agents for polycarbonates is described in DE-OS (German Published Specification) No. 2,921,325, it being possible in addition concomitantly to use halogen compounds which can, according to U.S. Pat. No. 3,392,136 quoted on page 9 of DE-OS (German Published Specification) No. 2,921,325, also be polyvinylidene fluorides. ABS copolymers can be admixed to the polycarbonates.

Inter alia, flame-retarding ABS polymers containing polytetrafluoroethylenes are disclosed in U.S. Pat. Nos. 4,355,126 and 4,107,232. Halogen compounds and triaryl phosphates are suitable for use as fire-retarding agents. Aromatic halogen compounds, such as chlorine-containing aromatic polycarbonates, are preferred. Triphenyl phosphate is particularly preferable and can also be employed in combination with hexabromobenzene.

Flame-retarding mixtures of polycarbonates, ABS polymers and halogen compounds are disclosed in DE-OS (German Published Specifications) Nos. 2,903,100 and 2,918,883. According to DE-OS (German Published Specification) No. 2,903,100, the flame-retarding action is achieved by means of special organic sulphonates. Fluorinated polyolefines can be added as drip-inhibiting agents. According to DE-OS (German Published Specification) No. 2,918,883 the flame-retarding action is achieved by means of alkali or alkaline earth metal salts of acids in combination with anti-drip agents, such as polytetrafluoroethylenes, the ABS polymers being only 10% by weight at most, relative to the total mixture.

Flame-retarding polymer mixtures containing, besides polytetrafluoroethylenes and organic halogen compounds, polyphosphates having molecular weights of 1,600 to 150,000 in amounts of 1 to 35% by weight are also known (EP-A No. 0,103,230). The polycarbonates of these moulding materials are, however, predominantly composed of tetramethylated diphenols.

DE-OS (German Published Specification) No. 3,322,260 discloses flame-retarding thermoplastic moulding materials containing (a) aromatic polycarbonates, (b) SAN graft polymers, (c) thermoplastic polymers, (d) if appropriate, halogen compounds, (e) antimony trioxide, antimony carbonate, bismuth trioxide or bismuth carbonate and (f) finely divided tetrafluoroethylene polymer, the latter being introduced into the moulding material via an aqueous emulsion of the SAN graft polymer (b) and, if appropriate, an aqueous emulsion of the thermoplastic polymer (c), whereby good surfaces in the moulding materials are achieved.

According to page 16 of this DE-OS it is possible to transfer this kind of incorporation of tetrafluoroethylene polymers onto all polycarbonate-containing moulding materials.

Regarding the difficulty of processing polytetrafluoroethylenes, reference should also be made to French patent specification No. 1,412,767; regarding the incorporation of polytetrafluoroethylenes into thermoplastics, such as aromatic polycarbonates or polymers of unsaturated monomers, reference should also be made to U.S. Pat. Nos. 3,294,871, and 3,005,795, in particular columns 3/4, where precipitation and coagulation are mentioned.

Flame-resistant mixtures of thermoplastics composed of 80 parts of an acrylonitrile/styrene copolymer and 20 parts of a tetrabromobisphenol A-polycarbonate are disclosed, for example, in JA-No. 49-02343.

The moulding materials according to the invention are distinguished by impact strength and good flame-retarding action.

Thermoplastic, aromatic copolycarbonates in terms of component A which are suitable in accordance with the invention are those based on diphenols of the formula (II)

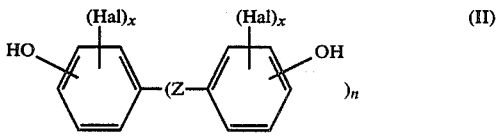

wherein
Z is a single bond, $C_1$–$C_5$-alkylene, $C_2$–$C_5$-alkylidene, $C_5$–$C_6$-cycloalkylidene, —S— or —$SO_2$—, Hal is chlorine or bromine,
x is 0, 1 or 2 and
"n" is 1 or 0,
the copolycarbonates in terms of component A. containing 3–20% by weight of halogen, in particular bromine, in the form of co-condensed halogenated diphenols.

Examples of suitable diphenols of the formula II are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane and 2,2-bis-(3,5-dibromo-4-hydroxyphenyl)-propane.

Preferred diphenols of the formula II are 2,2-bis-(4-hydroxyphenyl)-propane, 2,2-bis-(3,5-dichloro-4-hydroxyphenyl -propane, 2,2-bis-(3,5-dibromo-4-hydroxyphenyl)propane and 1,1-bis-(4-hydroxyphenyl)-cyclohexane.

The preparation of the polycarbonates in terms of component A. which are suitable in accordance with the invention is known from the literature and can, for example, be effected by means of phosgene by the phase boundary process or by means of phosgene by the process in a homogeneous phase (the so-called pyridine process), the molecular weight to be established in a particular case being achieved in a known manner by means of an appropriate amount of knOwn chain stoppers, such as, for instance, phenol.

The polycarbonates in terms of component A which are suitable in accordance with the invention have average weight average molecular weights ($\overline{M}w$, measured, for example, by ultracentrifugation or by the measurement of light scattering) of 10,000 to 200,000, preferably 20,000 to 80,000.

The polycarbonates in terms of component A. which are suitable in accordance with the invention can be branched in a known manner, preferably by incorporating 0.05 to 2.0 mol %, relative to the total of the diphenols employed, of trifunctional compounds or compounds having a functionality higher than three, for example compounds containing three or more than three phenolic OH groups.

Preferred copolycarbonates are copolycarbonates based on bisphenol A containing up to 15% by weight, relative to the total of the diphenols, of bis-(3,5-dibromo-4-hydroxyphenyl)-propane.

The thermoplastic polymers in terms of component B., according to the invention, are polymers formed from 50–95% by weight of styrene, α-methylstyrene, nuclear-substituted styrene or mixtures thereof and 5–50% by weight of (meth)acrylonitrile.

The polymers in terms of component B. are resinlike, thermoplastic and rubber-free. Particularly preferred polymers B. are those formed from styrene and/or α-methylstyrene together with acrylonitrile.

Particularly preferred ratios by weight in thermoplastic polymers B. are 60–80% by weight of styrene and/or α-methylstyrene and 40–20% by weight of acrylonitrile.

The polymers in terms of component B. are known and can be prepared by free-radical polymerization, in particular by emulsion polymerization, suspension polymerization, solution polymerization or bulk polymerization. The polymers in terms of component B. preferably have molecular weights $\overline{M}w$ (weight average, determined by light scattering or sedimentation) between 15,000 and 200,000.

The phosphorus compounds in terms of component C. which are suitable in accordance with the invention are generally known (see, for example, Ullmann, Enzyklopädie der technischen Chemie ("Encyclopaedia of Industrial Chemistry"), volume 18, page 301 et seq., 1979; HoubenWeyl, Methoden der organischen Chemie ("Methods of Organic Chemistry"), volume 12/1, page 43 and page 136; and Beilstein, volume 6, page 177).

Optionally halogenated $C_1$–$C_8$-alkyl radicals in terms of $R_1$, $R_2$ or $R_3$ of the formula (I) are, for example, chloroethyl, 2-chloropropyl, 2,3-dibromopropyl, butyl, methyl and octyl.

Optionally halogenated $C_6$–$C_{20}$-aryl radicals in terms of $R_1$, $R_2$ or $R_3$ of the formula (I) are, for example, chlorophenyl, bromophenyl, pentachlorophenyl, pentabromophenyl, phenyl, cresyl, isopropylphenyl and naphthyl.

Phosphorus compounds according to formula (I) which can be employed in accordance with the invention are, for example, tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, dimethyl methanephosphonate, diphenyl methanephosphonate and diethyl phenylphosphonate.

The tetrafluoroethylene polymers in terms of component D. which are suitable in accordance with the invention are polymers containing 65–76% by weight, preferably 70–76% by weight, of fluorine. Examples are polytetrafluoroethylene, tetrafluoroethylene/hexafluoropropylene copolymers or tetrafluoroethylene copolymers containing small amounts of fluorine-free, copolymerizable, ethylenically unsaturated monomers.

Polymers of this type are known. They can be prepared by known processes, for example by polymerizing tetrafluoroethylene in an aqueous medium by means of a catalyst which forms free radicals, for example sodium, potassium or ammonium peroxodisulphate, at pressures of 7–71 kg/cm$^3$ and at temperatures from 0° to 200° C., preferably at temperatures from 20° to 100° C. (U.S. Pat. No. 2,393,967).

The particle size of the tetrafluoroethylene polymers according to the invention is within the range from 0.05 to 20 μm, and their density is within the range from 1.2 to 1.9 g/cm$^3$.

The effect of adding tetrafluoroethylene polymers is, in particular, to reduce or completely prevent the formation of drips from the moulding material melts during the combustion process.

If the moulding materials according to the invention are prepared, for example, by melt-compounding in kneaders or extruders from granules or powders of the components A. to C. and from a polytetrafluoroethylene powder having a particle size and density greater than the range according to the invention, although moulding materials of high flame retarding action are obtained, shaped articles made therefrom sometimes have an imperfect surface, for example micro-cracks or streaks.

This is avoided with certainty if the very finely divided and, moreover, unsintered tetrafluoroethylene polymers are employed in the form of a coagulated mixture of emulsions of the tetrafluoroethylene polymers D. and emulsions of the graft polymers E.

An appropriate mixture is prepared by first mixing an aqueous emulsion (latex) of a graft polymer E. having average latex particle sizes from 0.1 to 2 μm, in particular 0.2 to 0.6 μm, with a finely divided emulsion in water of a tetrafluoroethylene polymer having average particle sizes from 0.05 to 20 μm, in particular from 0.08 to 10 μm; suitable tetrafluoroethylene polymer emulsions usually have solids contents of 30 to 70% by weight, in particular 50 to 60% by weight. The emulsions of the graft polymers E. have solids contents of 25 to 60% by weight, in particular 30 to 45% by weight.

In the mixture of emulsions, the ratio by weight of the graft polymer E. to the tetrafluoroethylene polymer D. is between 95:5 and 60:40. The mixture of emulsions is then coagulated in a known manner, for example by spray drying, freeze drying or coagulation by adding inorganic or organic salts, acids or bases or organic, water-miscible solvents, such as alcohols or ketones, preferably at temperatures from 20° to 150° C., in particular 50° to 100° C. If required, drying can be carried out at 50° to 200° C., preferably 70° to 100° C.

Suitable tetrafluoroethylene polymer emulsions are commercial products and are available, for example, from DuPont as Teflon ® 30 N.

Rubbers suitable for the preparation of the graft polymers in terms of component E. are, in particular, polybutadiene or butadiene/styrene copolymers containing up to 30% by weight, relative to the weight of rubber, of a lower alkyl ester of acrylic or methacrylic acid (for example methyl methacrylate, ethyl acrylate, methyl acrylate or ethyl methacrylate). Further examples of suitable rubbers are polyisoprene or polychloroprene. Further suitable rubbers are alkyl acrylate rubbers based on $C_1$-$C_8$-alkyl acrylates, in particular ethyl, butyl or ethylhexyl acrylate. These alkyl acrylate rubbers can, if appropriate, contain, copolymerized, up to 30% by weight, relative to the weight of rubber, of monomers such as vinyl acetate, acrylonitrile, styrene, methyl methacrylate and/or vinyl ethers. These alkyl acrylate rubbers can also contain minor amounts, preferably up to 5% by weight, relative to the weight of rubber, of ethylenically unsaturated monomers having a crosslinking action. Examples of crosslinking agents of this type are alkylenediol di(meth)acrylates, polyesterdi(meth)acrylates, divinylbenzene, trivinylbenzene, triallyl cyanurate, allyl (meth)acrylate, butadiene or isoprene. Alkyl acrylates of this type are known. Acrylate rubbers as the graft base can also be products containing, as the core, a crosslinking diene rubber formed from one or more conjugated diene, such as polybutadiene, or a copolymer of a conjugated diene with an ethylenically unsaturated monomer, such as styrene and/or acrylonitrile. Examples of other suitable rubbers are EPDM rubbers, that is to say rubbers formed from ethylene, propylene and a non-conjugated diene monomer.

Rubbers suitable for the preparation of the graft polymers E. are diene and alkyl acrylate rubbers.

The rubbers are present in the graft polymers E in the form of at least partially crosslinked particles having an average particle size of 0.1 to 2.0 μm, in particular 0.2 to 0.6 μm.

The graft polymers E. are prepared by free-radical graft copolymerization of the initially defined monomer mixtures consisting of E.1.1 and E.1.2 in the presence of the rubbers E.2 to be grafted, and they are, without exception, known. Preferred processes of preparation for the graft polymers E. are emulsion polymerization, solution polymerization, bulk polymerization or suspension polymerization. The so-called ABS polymers are particularly preferred graft polymers E. p-Methylstyrene and chlorostyrene may be mentioned as nuclear-substituted styrene.

Since the graft polymers E. according to the invention are used by previously mixing emulsions of them with emulsions of the component D., it is most preferable to prepare the component E. by the process of emulsion polymerization.

The thermoplastic moulding materials according to the invention can contain further additives known for polycarbonates or for the thermoplastic polymers, such as stabilizers, pigments, lubricants, mould release agents and/or antistatic agents.

The moulding materials according to the invention, consisting of the components A., B., C., D. and E. and, if appropriate, further known additives, such as stabilizers, pigments, lubricants, mould release agents and/or antistatic agents, are prepared by mixing the particular constituents in a known manner and then melt-compounding or melt-extruding the mixture at temperatures from 200° to 330° C. in customary units, such as internal kneaders or single screw or twin screw extruders, or by mixing solutions of the particular components in suitable organic solvents, for example in chlorobenzene, and thereafter evaporating the solvent mixtures in conventonal evaporation units, for example in evaporation extruders.

The present invention also relates, therefore, to a process for the preparation of thermoplastic moulding materials consisting of the components A., B., C., D. and E. and, if appropriate, stabilizers, pigments, lubricants, mould release agents and/or antistatic agents, which is characterized in that the components A., B., C., D. and E. and, if appropriate, stabilizers, pigments, lubricants, mould release agents and/or antistatic agents, are first mixed in known manner and then melt-compounded or melt extruded temperatures from 200° to 330° C. in conventional units, or solution$ of these components in suitable organic solvents are mixed, and the mixtures of solutions are then evaporated in conventional evaporation units.

The mixing of the individual constituents can be carried out in a known manner either successively or simultaneously and either at about 20° C. (room temperature) or at a higher temperature.

The moulding materials of the present invention can be used for the production of shaped articles of any kind. In particular, shaped articles can be produced by injection moulding. The following are examples of shaped articles which can be produced: casing components of any kind (for example for household equipment, such as coffee machines or mixers) or covering plates for the building industry and components for the automobile industry. In addition, they are employed in the field of electrical engineering, because they possess very good electrical properties.

A further form of processing is the production of shaped articles by the deep-drawing or hot-forming of plates or sheeting previously produced by extrusion.

Particle size denotes in all cases average particle diameter $d_{50}$, determined by ultracentrifuge measurements by the method of W. Scholtan et al., Kolloid-Z. u. Z. Polymere 250 (1972) 782–796.

EXAMPLES

Alloying components employed

A.

A copolycarbonate consisting of bisphenol A and 10% by weight of tetrabromobisphenol A, relative to copolycarbonate A, having a relative solution viscosity of 1.284, measured in $CH_2Cl_2$ at 25° C. and a concentration of 0.5 g/l; bromine content: approximately 5% by weight.

B.

Styrene/acrylonitrile copolymer having a styrene/acrylOnitrile ratio of 72:28 and an intrinsic viscosity of $[\eta]=0.55$ dl/g (measured in dimethylformamide at 20° C.).

C.1

Triphenyl phosphate

C.2

Diphenylcresyl phosphate

D. 1

Tetrafluoroethylene polymer as a coagulated mixture of an SAN graft polymer and a tetrafluoroethylene polymer emulsion in water; content of tetrafluoroethylene polymer in the mixture: 10% by weight, relative to the mixture PTFE graft polymer. The tetrafluOrOethylene polymer emulsion has a solids content of 60%; the particle size is between 0.05 and 0.5 μm. The SAN graft polymer emulsion has a solids content of 34% by weight and had a latex particle size of 0.3 to 0.4 μm.

Preparation of D.1: The emulsion of the tetrafluoroethylene polymer was mixed with the emulsion of the SAN graft polymer E, and was stabilized with 1.8% by weight, relative to polymer solids, of phenolic antioxidants. The mixture is coagulated at 85° to 95° C. by means of an aqueous solution of $MgSO_4$ (Epsom salt) and acetic acid at pH 4 to 5, and the coagulate is filtered off and washed until it is virtually free from electrolytes and then freed from the bulk of the water by centrifuging and then dried at 100° C. to give a powder. This powder is then compounded with the other components in the units described.

D.2

Tetrafluoroethylene polymer in powder form having a particle size of 500 to 650 μm and a density of 2.18 to 2.20 $g/cm^3$, made by Hoechst (Hostaflon TF 2026).

E.

SAN graft polymer consisting of 50% by weight of styrene/acrylonitrile mixture (in a ratio by weight of 72:28) grafted onto 50% by weight of particulate polybutadiene having an average particle size ($d_{50}$) of 0.3–0.4 μm, obtained by emulsion polymerization. Preparation of the moulding materials according to the invention The components A., B., C., D. and E. were compounded on a twin screw extruder (Werner and Pfleiderer), model ZSK 53, at a temperature of 230° C.

Shaped articles were produced on an injection moulding machine at 260° C.

The behaviour in fire of the samples was determined as specified in UL Subj. 94 V in test specimen thicknesses of 1.6 mm and 3,2 mm. The UL-94 test is carried out as follows:

Samples of substances are shaped to give bars of dimensions $127 \times 12.7 \times 1.6$ mm and 3,2 mm. The bars are mounted vertically so that the underside of the test specimen is 305 mm above a strip of bandage material. Each test bar is ignited individually by means of two successive ignition procedures of 10 seconds duration, the combustion properties after each ignition procedure are observed, and the sample is then assessed. A Bunsen burner with a blue flame of natural gas 10 mm (3.8 inches) high having a heat unit of $3.73 \times 10^4 kJ/m^3$ (1000 BTU per cubic foot) is used to ignite the sample.

The UL-94 V-0 classification embraces the properties, described below, of materials which have been tested as specified in the UL-94 specification. The polycarbonate moulding materials in this category contain no samples which burn longer than 10 seconds after each application of the test flame; they exhibit no total flame time longer than 50 seconds at the second application of flame to each set of samples; they contain no samples which burn up completely until the retaining clip fastened at the upper end of the sample is reached; they contain no samples which ignite the cotton wadding located below the sample by means of burning drips or particles; nor do they contain any samples which smoulder longer than 30 seconds after the removal of the test flame.

Other UL-94 classifications described samples which are less flame-retarding and self-extinguishing and which give off flaming drips or particles. These classifications are designated UL-94 V-1 and V-2. N.p. means "not passed" and is the classification of samples having an after-burn time of $\geq 30$ seconds.

The assessment of the surface of the shaped articles in respect of surface imperfections such as streaks was carried out visually on test specimens measuring $60 \times 40 \times 2$ mm.

The determination of notched impact strength and of impact strength was carried out by a method modelled on DIN 53,453/ISO R 179 On barS measuring $90 \times 10 \times 4$ mm the bars being provided with a V-shaped notch 2.7 mm deep for the notched impact strength.

The exact compositions of the moulding materials tested and the test data obtained can be seen from the following table.

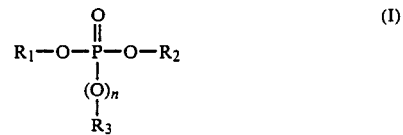

wherein n is zero or 1, and when n is zero;
$R_1$, $R_2$ and $R_3$ independently of one another denote an unsubstituted or halogen-substituted $C_1$ to $C_8$-alkyl, or a $C_6$ to $C_{20}$-aryl which is unsubstituted or substituted by alkyl or halogen and when n is 1, $R_1$, $R_2$ and $R_3$ independently of one another denote $C_6$ to $C_{20}$-aryl which is unsubstituted or substituted by alkyl or halogen, and D. 0.05 to 2.0 parts by weight, relative to 100 parts by weight of total weight of A. and B., of a tetrafluoroethylene polymer having average particle sizes of 0.05 to 20 μm and a density of 1.2 to 1.9 g/cm$^3$, the component D. being employed in the form of a coagulated mixture of emulsions of the tetrafluoro-

|  | A (parts by wt.) | B (parts by wt.) | C1 (parts by wt.) | C2 (parts by wt.) | D1 (parts by wt.) | D2 (parts by wt.) | UL-94 V 3.2 mm | UL-94 V 1.6 mm | Notched impact strength (kJ/m$^2$) | Impact strength (kJ/m$^2$) | Nature of the surface |
|---|---|---|---|---|---|---|---|---|---|---|---|
| Comparison tests | 75 | 25 |  |  |  |  | np* | np* | 6 | nf** | streak-free |
|  | 75 | 25 | 11.5 |  | 0.3 |  |  |  |  | nf | streaks |
| Tests according to the invention | 75 | 25 | 11.5 | 3.5 |  |  | V0 | V0 | 6 | nf | streak-free |
|  | 75 | 25 |  | 11.5 | 3.5 |  | V0 | V0 | 5 | nf | streak-free |

*not passed
**not fractured

We claim:

1. A thermoplastic polycarbonate moulding material comprising:
   A. 50 to 90% by weight of a halogen-containing copolycarbonate containing 3 to 20% by weight of halogen formed from a dihydric phenol of the formula

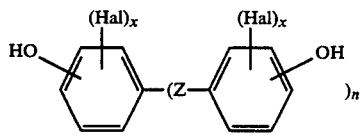

wherein
Z is a single bond, $C_1$–$C_5$-alkylene, $C_2$–$C_5$-alkylidene, $C_5$–$C_6$-cycloalkylidene, —S— or —SO$_2$—, Hal is chlorine or bromine,
x is 0, 1 or 2 and n is 1 or 0, the copolycarbonate containing 3 to 20% by weight of halogen in the form of co-condensed, halogenated, dihydric phenol,
   B. 10 to 50% by weight of a thermoplastic polymer formed from 50 to 95 parts by weight of styrene, α-methylstyrene, nuclear-substituted styrene or mixtures thereof and 5 to 50% by weight of (meth)acrylonitrile,
   C. 5 to 15 parts by weight, relative to 100 parts by weight of total weight of A. and B., of a phosphorous compound of the general formula ethylene polymers D. and emulsions consisting of not more than 3 parts by weight, but at least 0.1 parts by weight, relative to 100 parts by weight of the sum of the components A+B, of
   E. graft polymers formed from
   E.1. 5 to 90 parts by weight of a mixture of
      (i) 50 to 95% by weight of styrene, α-methylstyrene, nuclear-substituted styrene, methyl methacrylate or mixtures thereof
      (ii) 50 to 5% by weight of (meth)acrylonitrile, methyl methacrylate, maleic anhydride, N-substituted maleimide or mixtures thereof, grafted onto
   E.2. 95 to 10 parts by weight, of a rubber having a glass transition temperature $T_G \geq 10°$ C., and the ratio by weight of the graft polymer E. to the tetrafluoroethylene polymer D. being between 95:5 and 60:40.

2. A moulding material according to claim 1, in which the copolycarbonate of component A. contains 3 to 20% by weight of bromine in the form of co-condensed, brominated, dihydric phenol.

3. A moulding material according to claim 1, in which the copolycarbonate A. contains up to 15% by weight, relative to the total of the diphenols, of bis-(3,5-dibromo-4-hydroxyphenyl)-propane.

4. A moulding material according to claim 1 in which the thermoplastic polymer of component B is formed from styrene and/or α-methylstyrene together with acrylonitrile.

5. A moulding material according to claim 4, in which the thermoplastic polymer of component B comprises 60 to 80% by weight of styrene and/or α-methylstyrene and 40 to 20% by weight of acrylonitrile.

6. A moulding material according to claim 1, in which component D. is present in amounts of 0.1 to 1.0 part by weight.

7. A moulding material according to claim 1, 2 or 3 in which the tetrafluoroethylene polymer of component D. is selected from polytetrafluoroethylene, tetrafluoroethylene/hexafluoropropylene copolymers or tetrafluoroethylene copolymers containing minor amounts of fluorine-free, copolymerisable, ethylenically unsaturated monomers 8. A moulding material according to claim 1, 2 or 3 in which the graft polymer E. has been prepared from 30 to 80 parts by weight of a mixture of E. 1 (i) and E. 1. (ii) grafted onto 70 to 20 parts by weight of a rubber E. 2.

9. A moulding material according to claim 1, 2 or 3 in which graft polymer E. is an ABS polymer.

10. A moulding material according to claim 1, additionally comprising at least one additive selected from stabilizers, pigments, lubricants, mould release and antistatic agents.

11. A process for the production of a moulding material according to claim 1 in which components A., B., C., D. and E. are mixed and are then melt-compounded or melt-extruded at temperatures from 200° C. to 330° C. in a melt-compounding or melt-extrusion unit.

12. A process for the production of a moulding material according to claim 1 in which solutions of the components A., B., C., D. and E. in an organic solvents are mixed, and the mixture of solution is then evaporated in an evaporation unit.

13. A process according to claim 11, in which at least one additive selected from stabilizers, pigments, lubricants, mould release agents and antistatic agents is incorporated in the mixture or solutions.

14. A moulding material whenever produced by the process of claim 14.

15. A moulded article whenever produced from a moulding material according to claim 1.

* * * * *